US012703216B2

(12) United States Patent
Heon et al.

(10) Patent No.: US 12,703,216 B2
(45) Date of Patent: Aug. 11, 2026

(54) DUAL AIR SPRING DESIGN FOR APPLICATIONS WITH NARROW PACKAGING ENVELOPE AND HIGH LOAD REQUIREMENTS

(71) Applicant: Wheel Pros, LLC, Greenwood Village, CO (US)

(72) Inventors: Reno Heon, San Luis Obispo, CA (US); Dustin Heon, Arroyo Grande, CA (US)

(73) Assignee: Wheel Pros, LLC, Greenwood Village, CO (US)

( * ) Notice: Subject to any disclaimer, the term of this patent is extended or adjusted under 35 U.S.C. 154(b) by 583 days.

(21) Appl. No.: 17/902,972

(22) Filed: Sep. 5, 2022

(65) Prior Publication Data

US 2023/0096223 A1 Mar. 30, 2023

Related U.S. Application Data

(60) Provisional application No. 63/241,043, filed on Sep. 6, 2021.

(51) Int. Cl.
*B60G 11/46* (2006.01)

(52) U.S. Cl.
CPC .... *B60G 11/465* (2013.01); *B60G 2202/1524* (2013.01); *B60G 2206/42* (2013.01); *B60G 2800/162* (2013.01)

(58) Field of Classification Search
CPC .......... B60G 11/465; B60G 2202/1524; B60G 2206/42; B60G 2800/162; B60G 2200/31; B60G 2204/121; B60G 2204/126; B60G 2206/911
USPC ........................................ 267/31, 5, 29, 202
See application file for complete search history.

(56) References Cited

U.S. PATENT DOCUMENTS 5,046,752 A * 9/1991 Stephens .................. B60G 9/00 280/124.157
5,464,245 A * 11/1995 Vogler .................. B60G 11/113 280/124.17
5,873,581 A * 2/1999 Yale .................. B60G 17/0408 280/5.514
6,428,027 B1 8/2002 Stuart
6,739,608 B2 * 5/2004 Warinner .............. B60G 11/30 280/124.163
7,500,688 B2 3/2009 Mullican
8,439,378 B2 5/2013 Phillips
9,649,906 B2 5/2017 Myers (Continued)

FOREIGN PATENT DOCUMENTS

CN 201501263 U 6/2010
CN 106061767 B 8/2019
CN 114763047 A * 7/2022

*Primary Examiner* — Jason D Shanske
*Assistant Examiner* — Caitlin Anne Miller
(74) *Attorney, Agent, or Firm* — Womble Bond Dickinson (US) LLP

(57) ABSTRACT

A Dual Air Spring Design for Applications with Narrow-Packaging Envelope and High Load Requirements provides two, small-diameter air springs that can be retrofitted onto an existing vehicle frame to provide additional lift and suspension capabilities. The smaller size allows for the same lifting and suspension capabilities as a traditional, single air spring, but with easier and more compact installation, without impeding the factory bump-stops and easy integration with aftermarket lift blocks.

9 Claims, 2 Drawing Sheets

(56) References Cited

U.S. PATENT DOCUMENTS

| | | | | |
|---|---|---|---|---|
| 10,266,025 | B2 | 4/2019 | Lorenz | |
| 12,172,483 | B2 * | 12/2024 | Heon | B60G 11/28 |
| 2008/0023931 | A1 * | 1/2008 | Myers | B60G 11/28<br>280/124.157 |
| 2009/0167057 | A1 | 7/2009 | Walter | |
| 2009/0278290 | A1 | 11/2009 | Trowbridge | |
| 2019/0255900 | A1 | 8/2019 | Keiserman | |
| 2024/0075781 | A1 * | 3/2024 | Heon | B60G 9/003 |

* cited by examiner

DUAL AIR SPRING DESIGN FOR APPLICATIONS WITH NARROW PACKAGING ENVELOPE AND HIGH LOAD REQUIREMENTS

CROSS REFERENCE TO RELATED APPLICATIONS

This application claims priority back to U.S. Provisional No. 63/241,043, filed Sep. 6, 2021, the contents of which are incorporated by reference.

STATEMENT REGARDING FEDERALLY SPONSORED RESEARCH OR DEVELOPMENT

This invention was not federally sponsored.

INVENTORS

Reno N. Heon, resident of San Luis Obispo and citizen of USA, and Dustin B. Heon, resident of Arroyo Grande and citizen of USA.

BACKGROUND OF THE INVENTION

Field of the Invention

This invention relates to the general field of suspension for vehicles, and more particularly to novel technology relating to manufacturing of efficient and effective dual air springs that replace a single, bulkier air spring. This patent application covers the method of using the product, the method of making the product and the end product itself.

Background of the Invention

Vehicles generally come with leaf-spring suspension, which consists of one or more bent pieces of metal that rest the vehicle frame on the axel, and absorb a lot of the rough ride experienced by the tires. Some vehicles have a combination of leaf-spring (mechanical) suspension and air suspension. However, creating a single air spring that is a) effective, b) easy to install, and c) does not get in the way of other parts of the vehicle has proven difficult. This invention solves the problem by proposing dual air springs for each side of the vehicle. With dual air springs each having one half the lifting capacity of a larger air spring, the lifting capacity is that same as would be accomplished through installation of a single, bulky air spring, without the installation and space problems that accompany installation of a single, bulky air spring.

Problem Described

When installing a single air spring on a vehicle, the air spring has to have a diameter large enough to supply the necessary lighting capacity to provide effective suspension. However, these single air springs require a large diameter that makes installation difficult and often "gets in the way" of other vehicle parts

SUMMARY OF INVENTION

The invention is a Dual Air Spring Design for Applications with NarrowPackaging Envelope and High Load Requirements provides two, small-diameter air springs that can be retrofitted onto an existing vehicle frame to provide additional lift and suspension capabilities. The smaller size allows for the same lifting and suspension capabilities as a traditional, single air spring, but with easier and more compact installation, without impeding the factory bump-stops and easy integration with aftermarket lift blocks.

Advantages Over Products Currently on the Market

The invention as described in this provisional application allows a secondary air suspension system to be easily installed between a vehicle frame and a factory leaf spring, while achieving the desired load carrying capability of a larger single air spring mounted elsewhere in the suspension.

The available "packing" space between the frame and the leaf spring is typically very tall compared to other locations within the suspension which allows for the packaging of taller air springs which results in more vertical suspension travel.

Many conventional larger diameter air springs used in conventional secondary air suspension systems mount in the place of the factory bump stops which inhibits the suspension system's overall performance. The invention described herein retains the factory bump-stops which improves overall suspension performance.

The packaging location of the invention described herein allows the secondary air suspension to mount to the top of the leaf spring which automatically accommodates the use of common lift blocks between the axle and the leaf spring without any changes to the air spring mounting brackets.

Prior Art

The prior art provides the current state-of-the-art in installable air springs.

For example, U.S. Pat. No. 6,739,608 discloses a suspension-system for a vehicle has two or more leaf-spring groups that vertically support a portion of the weight of a suspended structure of the vehicle. The novel suspension-system further includes pneumatic springs that are engaged to spring-support components of the novel suspension-system and also the suspended structure supported by the novel suspension-system in such a manner that the pneumatic springs assist the leaf-spring groups of the novel suspension system in vertically supporting the weight of the suspended structure.

SpecAbraCN114763047 to Shaanxi Heavy Duty Automobile Co Ltd describes a front composite air suspension system which has a front extension beam attaching to the frame of a vehicle, a steel plate spring front support, a steel plate spring rear support, a steel plate spring connecting plate, an air spring upper support, an air spring lower support, a pressing plate, a U-shaped bolt, a shock absorber upper support, a shock absorber lower support and a steering shaft, This invention provides a composite structure of 4 air springs and 2 steel plate springs, but lacks the simplicity of the current invention, which can be easily attached (and removed) from a standard vehicle leaf spring.

U.S. Pat. No. 6,739,608 to International Truck Intellectual Property Co. LLC discloses a suspension-system for a vehicle has two or more leaf-spring groups that vertically support a portion of the weight of a suspended structure of the vehicle. This invention, however, contains a large number of additional parts, resulting in a more expensive product with more parts to break and wear out.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

The present invention is a uniquely designed dual air spring device, utilizing unique and effective/efficient technologies to create a superior, smaller product that is significantly easier to install and maintain, as well as not impeding any of the factory bump-stops. The various advantages provided by this invention are described more fully with respect to the drawings that have been provided.

Figure 1:
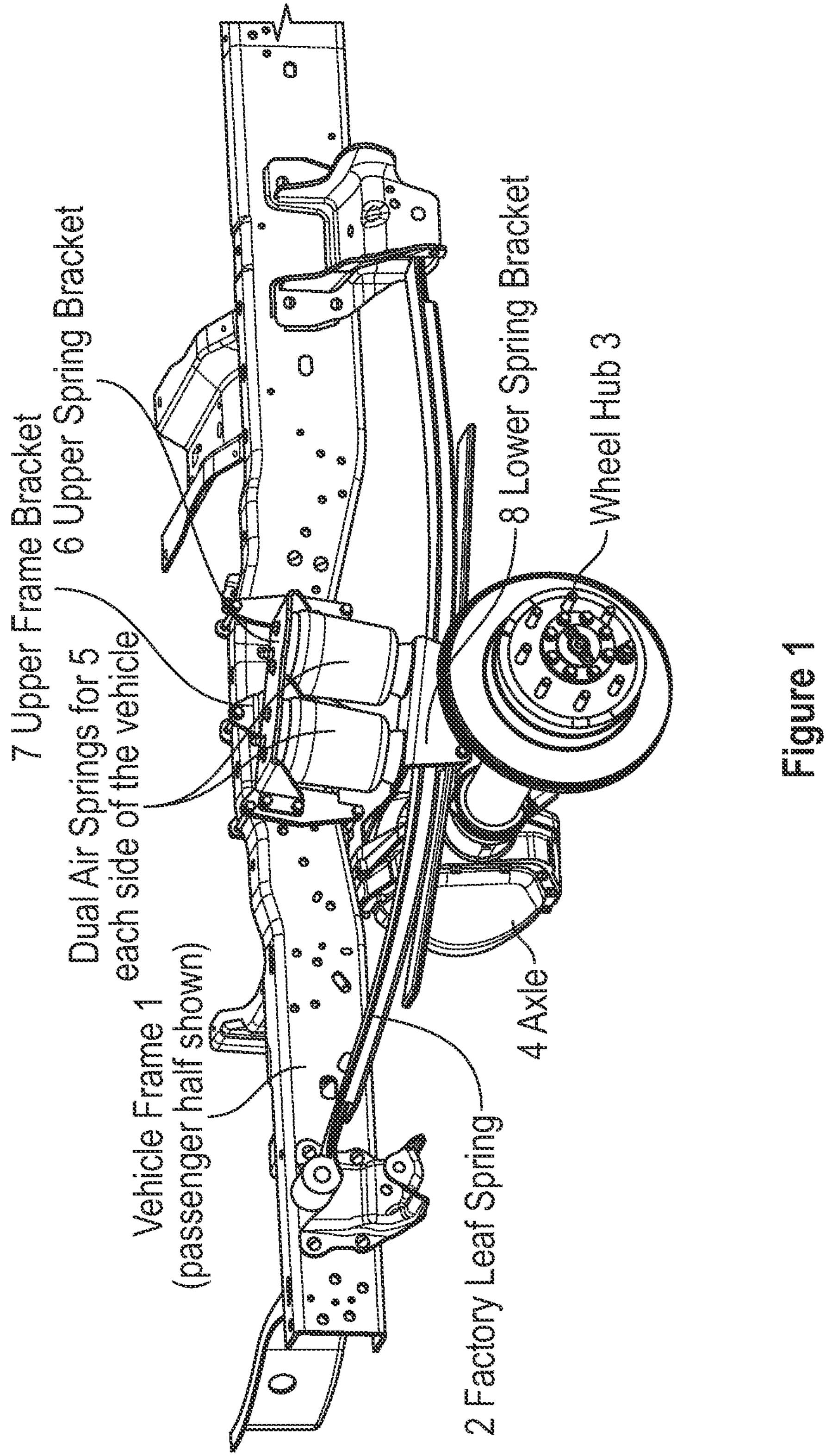
FIG. 1 is a side, perspective view of one preferred embodiment of the dual air spring device.

FIG. 1 is a side, perspective view of one preferred embodiment of the dual air spring device. The vehicle generally comes with a Vehicle Frame 1 and a Factory Leaf Spring 2, which provides suspension between the Vehicle Frame 1 and the Axel 4. As a tire bounces along rough roads, the jarring is transferred from the Wheel Hub 3 to the Axle 4. The Factory Leaf Spring 2 helps to absorb some of the jarring. Many vehicle owners would like a second "defense" against bumpy roads, and so elect to install an air spring between the Factory Leaf Spring 2 and the Vehicle Frame 1. The current invention provides a Dual Air Spring 5 on each side of the vehicle. The Dual Air Springs 5 are attached at the bottom by a Lower Spring Bracket 8 to the Factory Leaf Spring 2. At the upper end, the Dual Air Springs are attached to an Upper Spring Bracket 6, which, in turn, is attached to an Upper Frame Bracket 7 which is attached to the Vehicle Frame 1.

Figure 2:
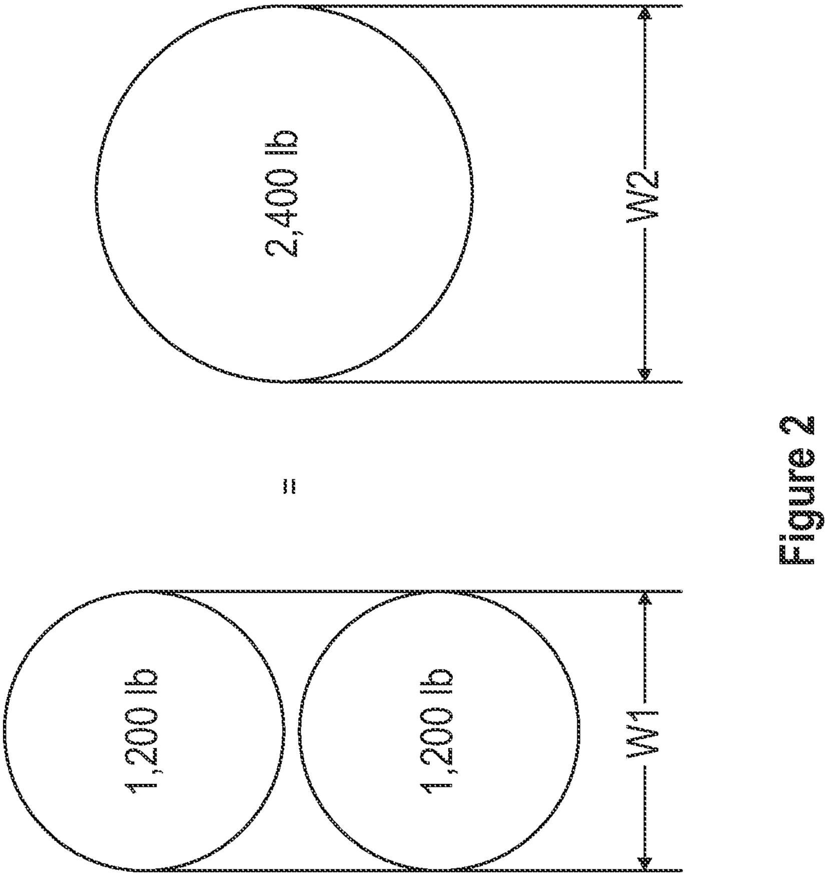
FIG. 2 is a graphical representation showing how two smaller diameter air springs can provide that same lifting capability as one larger air spring.

FIG. 2 is a graphical representation showing how two smaller diameter air springs can provide that same lifting capability as one larger air spring.

The maximum lifting capacity of an air spring is determined by its diameter through the formula of Force=Pressure×Area. When retrofitting a secondary air suspension system on an existing vehicle, there is often limited packaging space for the air spring on the leaf spring. To obtain the same lifting capacity, the invention proposes two, smaller diameter air springs set up in a series on the leaf spring. This figure shows how two smaller diameter air springs provide a narrower width than one larger one.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

Many aspects of the invention can be better understood with references made to the drawings as attached. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Vehicle Frame
2. Factory Leaf Spring
3. Wheel Hub
4. Axel
5. Dual Air Springs
6. Upper Spring Bracket
7. Upper Frame Brackets
8. Lower Spring Bracket

We claim:

1. A device for providing air suspense to a vehicle having a vehicle front and a vehicle rear, the device comprising:

a first air spring having an upper end and a lower end opposite the upper end;

a second air spring having an upper end and a lower end opposite the upper end;

an upper frame bracket configured to attach to a vehicle frame of the vehicle;

an upper spring bracket formed as a one-piece construction, the upper spring bracket attached to the upper frame bracket; and a lower spring bracket formed as a one-piece construction, the lower spring bracket configured to attach to a leaf spring of the vehicle, the upper end of each of the first and second air springs attached to the upper spring bracket and the lower end of each of the first and second air springs attached to the lower spring bracket such that the first and second air springs are retained between the upper spring bracket and the lower spring bracket with the first and second air springs aligned on the lower spring bracket in a linear aspect, the first air spring positioned closer to the vehicle front and the second air spring positioned closer to the vehicle rear with the lower end of the first air spring located in front of a central axis defined by an axle of the vehicle and the lower end of the second air spring is located behind the central axis of the axle when the upper frame bracket is attached to the vehicle frame and the lower spring bracket is attached to the leaf spring.

2. The device according to claim 1, wherein the first air spring and the second air spring are attached to a top of the lower spring bracket and the upper spring bracket, the upper frame bracket attached to a top of the vehicle frame and to an outer side of the vehicle frame, the upper spring bracket attached to the upper frame bracket.

3. A device for providing air suspense to a vehicle having a vehicle front and a vehicle rear, the device comprising:

a first air spring having an upper end and a lower end opposite the upper end;

a second air spring having an upper end and a lower end opposite the upper end;

an upper frame bracket configured to attach to a vehicle frame of the vehicle;

an upper spring bracket formed as a one-piece construction, the upper spring bracket attached to the upper frame bracket; and a lower spring bracket formed as a one-piece construction, the upper spring bracket configured to attach to a leaf spring of the vehicle, the first and second air springs are retained between the upper spring bracket and the lower spring bracket, the lower end of the first air spring located in front of a central axis defined by an axle of the vehicle and the lower end of the second air spring located behind the central axis when the upper frame bracket is attached to the vehicle frame and the lower spring bracket is attached to the leaf spring.

4. The device according to claim 3, wherein the first air spring and the second air spring are aligned on the lower spring bracket in a linear aspect such that the first air spring is closer to the vehicle front and the second air spring is closer to the vehicle rear.

5. The device according to claim 4, wherein the first air spring and the second air spring are attached to a top of the lower spring bracket and attached to a bottom of the upper spring bracket, the upper frame bracket attached to the top of the vehicle frame and to the outer side of the vehicle frame, the upper spring bracket attached to the upper frame bracket.

6. The device according to claim 3, wherein lower spring bracket is configured to attach to the leaf spring directly over the axle such that the lower end of the first air spring is attached to the lower spring bracket in front of the central axis of the axle and the lower end of the second air spring is attached to the lower spring bracket behind the central axis of the axle.

7. A method of providing air suspense to a vehicle comprising:

attaching a lower spring bracket to a leaf spring of the vehicle, the lower spring bracket formed as a one-piece construction;

attaching an upper frame bracket to a vehicle frame of the vehicle; and attaching an upper spring bracket to the upper frame bracket, the upper spring bracket formed as a one-piece construction, the upper spring bracket and the lower spring bracket retaining a first air spring and the second air spring therebetween with a lower end of the first air spring located in front of a central axis defined by an axle of the vehicle and a lower end of the second air spring located behind the central axis.

8. The method according claim 7, wherein attaching the lower spring bracket includes the first and second air springs being aligned on the lower spring bracket in a linear aspect such that the first air spring is closer to a vehicle front and a second air spring is closer to a vehicle rear.

9. The method according to claim 7, wherein attaching the lower spring bracket includes lower spring bracket being located on an outer side of a vehicle frame.

* * * * *